(12) United States Patent
Kazutoshi (10) Patent No.: US 7,009,860 B2
(45) Date of Patent: Mar. 7, 2006

(54) CONTACTLESS POWER SUPPLY SYSTEM

(75) Inventor: Takeda Kazutoshi, Aichi (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/004,372

(22) Filed: Dec. 3, 2004

(65) Prior Publication Data

US 2005/0135129 A1    Jun. 23, 2005

(30) Foreign Application Priority Data

Dec. 5, 2003    (JP)    ............... 2003-406614

(51) Int. Cl.
*H02M 5/42* (2006.01)
*H02M 7/44* (2006.01)

(52) U.S. Cl. ............ 363/98; 363/132; 307/10.1

(58) Field of Classification Search ............ 363/95, 363/98, 132; 307/10.1

See application file for complete search history.

(56) References Cited

U.S. PATENT DOCUMENTS

| | | | |
|---|---|---|---|
| 5,574,410 A * | 11/1996 | Collins et al. | 333/17.3 |
| 6,134,130 A * | 10/2000 | Connell et al. | 363/89 |
| 6,307,766 B1 * | 10/2001 | Ross et al. | 363/144 |
| 6,515,878 B1 * | 2/2003 | Meins et al. | 363/37 |

* cited by examiner

*Primary Examiner*—Bao Q. Vu
(74) *Attorney, Agent, or Firm*—Thomas, Kayden, Horstemeyer & Risley (57) ABSTRACT

A contactless power supply system that limits current to inductive wires, even when circuit load varies. The inductive wires are connected in series to a capacitor and a variable inductor to yield a capacitive impedance at a predetermined frequency f (e.g., 10 KHz). In doing so, a finite current at the predetermined frequency f can be asserted to the inductive wires even when circuit load is reduced to 0. Consequently the current fluctuation in the inductive wires is suppressed and the contactless power supply system becomes more manageable.

4 Claims, 7 Drawing Sheets

CONTACTLESS POWER SUPPLY SYSTEM

BACKGROUND

This invention relates to a contactless power supply system, with inductive wires along a traveling path of a moving object. The inductive wires operate at a predetermined frequency under an alternating current (AC) power supply. The moving object has a built-in power inducing coil coupled to the inductive wires. The power inducing coil in the moving object induces energy for supplying to a power consuming load.

An example of a conventional contactless power supply system, comprises a power supply device limiting current into inductive wires to a fixed current value, as disclosed in Japan publication No. 10-174206.

The power supply device cited comprises, a current converter powered by the inductive wires outputting a fixed high frequency current, a control amplifier controlling the current (wire current) to the inductive wires, a pulse width modulation (PWM) circuit acting as a switching device regulating wire current and frequency with the output value of the controller amplifier, and a gate driving circuit. The power supply device with an equivalent circuit employs the wire current value as the control decision current. Moreover, capacitors connected in parallel to the power supply rails result in a resonant circuit.

However, in the conventional contactless power supply system, the inductive wires provide minimal impedance, hence the load fluctuation in the inductive wires produces a significant change in the wire current. As load decreases and the current varies significantly, the control decision current may diverge to an uncontrollable degree.

SUMMARY

An object of an embodiment of the present invention is to provide a contactless power supply system, that can impose continuous control on current in inductive wires, even when circuit load varies.

To fulfill the above object, a contactless power supply system, comprises a power supply device, having inductive wires for AC power supply at a predetermined frequency, along a traveling path of a moving object, a plurality of switching devices driven by square waves respectively, converting direct current (DC) to alternating current of a predetermined frequency, supplying the inductive wire wherein the moving object comprises a power inducing coil that induces power from the inductive wires and supplies power to the moving object load, with the inductive wires connected in series to a capacitor and a variable inductor as a predetermined length of the inductive wires is not reached; and the inductive wires, connected in series to the capacitor and the variable inductor under the predetermined frequency resulting a capacitive impedance.

With regarding to the above arrangement, series connected inductive wires, capacitor, and variable inductor provide a capacitive impedance at the predetermined frequency, wherein the impedance of the capacitor is set to exceed than the total impedance of inductive wires and the variable inductor, such that AC current to the inductive wires does not drop to 0. Consequently, fluctuation of the current is suppressed despite circuit load variation. Since impedance of the series capacitor is inversely proportional to its capacitance, the impedance of the series capacitor increases as its capacitance decreases. Employment of capacitive impedance is thus a simple and adjustable approach. It is also more cost effective compared to increasing inductor inductance. Hence, the impedance of the capacitor is set to exceed total impedance of inductive wires and variable inductor, i.e., capacitive impedance, for a preferred implementation.

Also provided is the second contactless power supply system as the first aspect, further comprising a current detection circuit detecting an output current to the inductive wire, a power detection circuit detecting output power to the inductive wire, and a control circuit, controlling duty of square waves that drives the switching devices, based on output current detected at the current detection circuit, wherein the control circuit switches to a control constant, based on output power detected at the power detection circuit.

With reference to the above arrangement, the output power is a predetermined value. The choice of the control constant is derived from the predetermined value. For example, when the output power falls below the predetermined value, the output gain is switched to low, so that the variation in the square wave can be minimized, and the output current fluctuation due to load variation can be restrained.

Also provided is the third contactless power supply system as the first aspect, further comprising a current detection circuit, detecting an output current to the inductive wire, a power detection circuit, detecting an output power to the inductive wire, and a control circuit, controlling a duty of square waves that drives the switching devices, based on an output current detected at the current detection circuit, wherein the control circuit selects duration of evaluation of the duty, based on the output power detected at the power detection circuit.

With accordance to the above arrangement, the output power is a predetermined value. Time duration of evaluation of the duty is derived from the predetermined value. For example, when the output power falls below the predetermined value, the time duration of evaluation of the duty is extended, so that the variation in the square wave is minimized, and the output current fluctuation due to load variation can be restrained.

The fourth aspect of the present invention described is the contactless power supply system as the first aspect, further comprising: a current detection circuit, detecting an output current to inductive wires, a power detection circuit, detecting an output power to the inductive wires and a control circuit, controlling a duty of square waves that drives the switching devices, based on an output current detected at the current detection circuit, wherein the control circuit choosing an adjustable range of the duty, based on the output power detected at the power detection circuit.

With respect to the above arrangement, the output power is a predetermined value. The choice of the adjustable range of the duty is derived from the predetermined value. For example, when the output power falls below the predetermined value, the adjustable range of the duty is narrowed, so that the variation in the square wave is minimized, and the output current fluctuation due to load variation is restrained.

The contactless power supply system in the present invention is complimented in such a way that the impedance of the series capacitor exceeds the total impedance to the inductive wires and the variable inductor at a predetermined frequency. Thus the overall impedance remains above 0 and current to the inductive wires is limited, even when circuit load varies.

To demonstrate the above and the other objectives, features and advantages of the present invention are explained in detail in an embodiment as follows, with the accompanying drawings.

BRIEF DESCRIPTION OF THE DRAWINGS

The invention will become more fully understood from the detailed description, given herein below, and the accompanying drawings. The drawings and description are provided for purposes of illustration only and, thus, are not intended to be limiting of the present invention.

DESCRIPTION

Please refer to the corresponding figures for explanation of the embodiment in the present invention.

Figure 1:
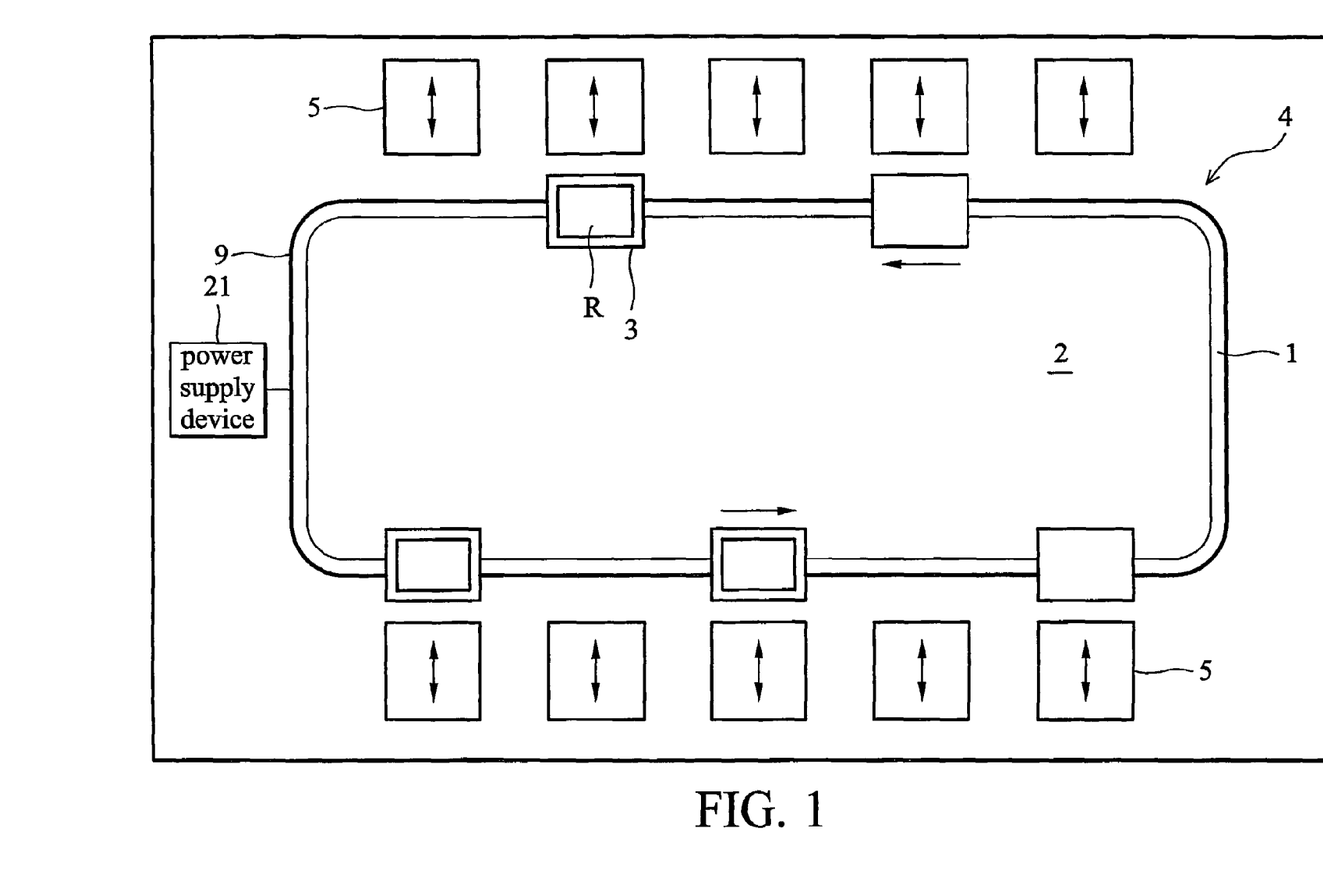
FIG. 1 is a traveling path for a contactless power supply system for object transportationtransportation in one embodiment of the present invention.
Figure 2:
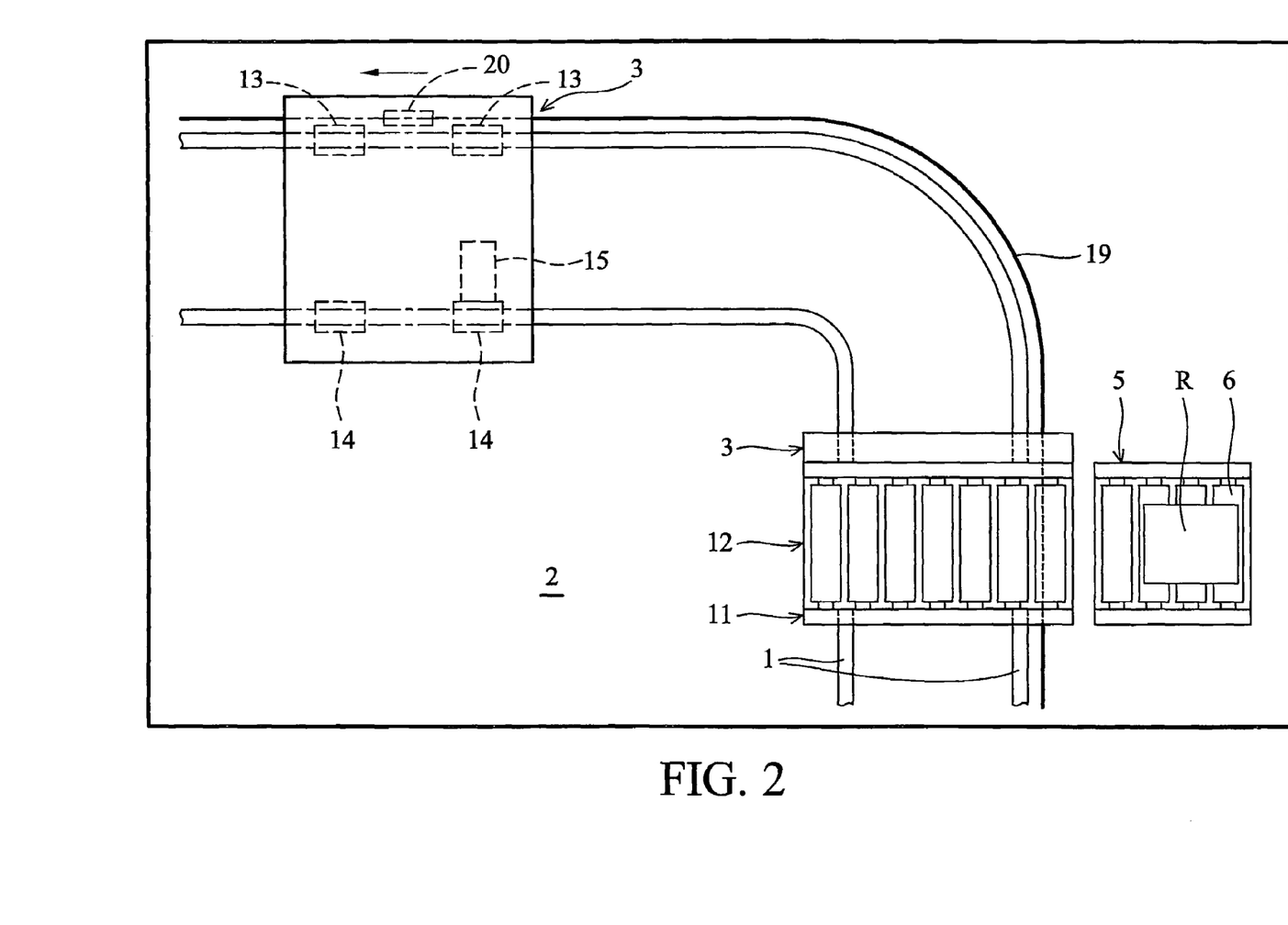
FIG. 2 is a block diagram of primary parts of the contactless power supply system for object transportation.

FIG. 1 depicts a traveling path for an object transportation facility that employs the contactless power supply system of an embodiment of the present invention. FIG. 2 is a structural diagram of the primary components of the object transportation facility.

Referring to FIG. 1 and FIG. 2, a pair of transport rails 1 on floor 2 supports a four-wheeled transport cart 3 for object R. The total number of transport cart 3 is five.

The transport rails 1 form a looping path (one example of a transport path) 4. A plurality of rail stops 5 (nine in the embodiment) is introduced on the transport path 4. The transport carts 3 follow the transport path 4, moving objects therealong.

A load mover for object R between each rail stop 5 and each transport cartacts as a transferring facility to move the load in and out. (e.g., roller type or chain type transfer devices).

The transport cart 3 shown in FIG. 2 incldues a cart body 11, a load mover 12 installed on the cart body for moving the object R, (e.g., roller type or chain type transfer devices), two spinning style passive wheels 13 on the lower part of the cart body 11 providing support to the cart body 11 on one side of transport rails 1, two spinning style sliding wheels 14 that trace the direction of the transport rails 1 and providing adjustable (slidable) separation of the two spinning style passive wheels 13. In addition, one of the spinning style sliding wheels 14 is attached to a transport motor 15 (whereby electrical energy is converted to kinetic energy) driving the cart.

Figure 3:
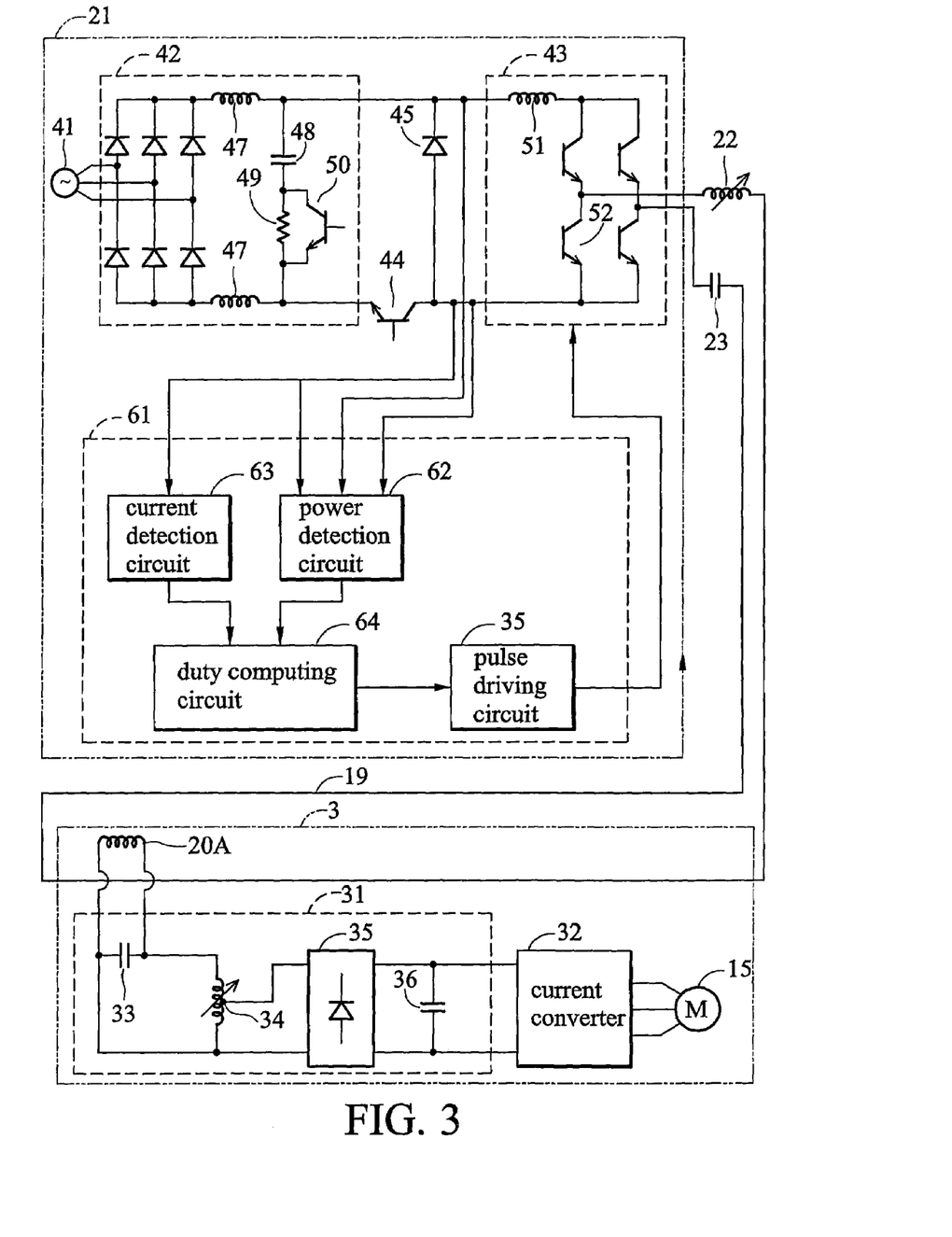
FIG. 3 is a schematic diagram of a contactless power supply system for object transportationtransportation.

A pair of inductive wires 19 are disposed on the top and bottom respectively, of the outer contour of the transport rails 1. A signal pickup unit 20 supplyies power to the transferring motor 15 on the side of spinning style passive wheels 13. The signal pickup unit 20 is implemented by a signal pickup coil 20A, consisting of wires twisted around the center extruding bar of an E shaped ferrite (the signal pickup coil being the counterpart of the inductive wires 19), the inductive wires 19 in and fixed along the concave parts of the ferrite. The signal pickup coil (power inducing coil) 20A induces power transport motor 15 with the power. A power supply device 21 transforms direct current to alternating current at a predetermined high frequency (e.g., 10 KMHz) for inductive wires 19. As depicted in FIG. 3, the inductive wires 19 are connected to a capacitor 23 in series, as well as a variable inductor 22 for tuning the inductance value. When the inductive wires 19 do not reach their full path, the variable inductor 22 provides complementary inductance to restore the predetermined inductance value.

The variable inductor 22 with inductance L and capacitor 23 with capacitance C connected in series with the inductive 19 at a predetermined frequency f (e.g., 10 KHz), yields a capacitive impedance.

Figure 4A:
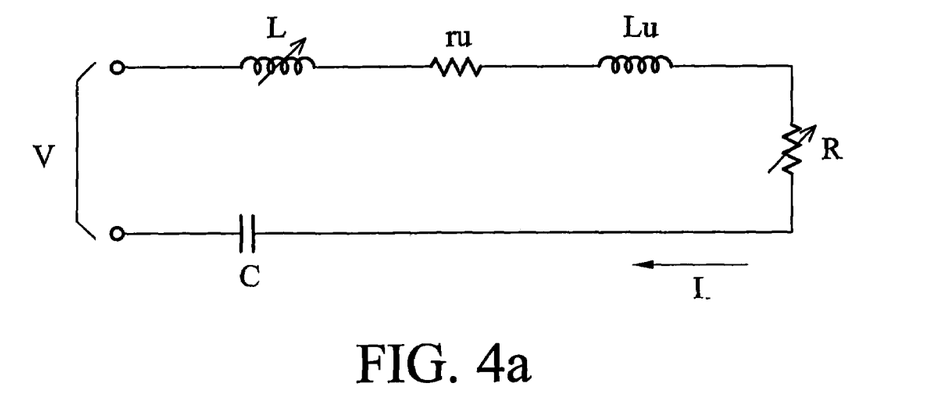
FIG. 4 is an equivalent circuit diagram and a phase diagram for a contactless power supply system for object transportationobject transportation.
Figure 4B:
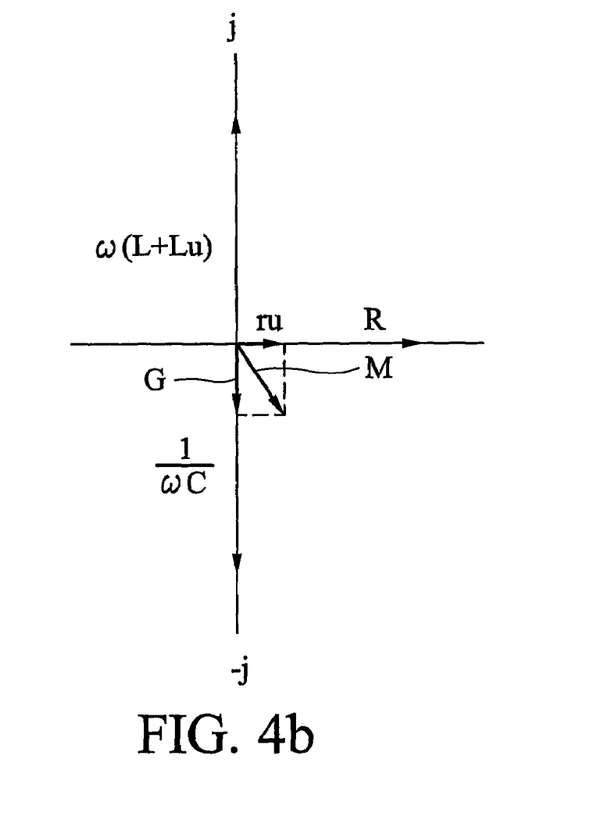

As illustrated in FIG. 4($a$), the predetermined inductance value for inductive wires 19 at full path is Lu, with resistance ru. The five transport carts 3 have an equivalent load resistance of R at the primary circuit. The inductive wires 19 operate under a predetermined frequency f (e.g., 10 KHz) and an angular frequency co. The reactance of capacitor 23 is larger, hence the capacitive impedance is represented as:

$$(1/(j\omega C)) > j\omega(L+Lu)$$

the absolute value $|(1/(j\omega C))-j\omega(L+Lu)|<\delta$, where $\delta$ is a predetermined value. As demonstrated in FIG. 4($b$), when all of the stationary transport carts 3 are loadless (R=0), resistance ru of the inductive wires 19 is estimated as the least value (e.g., 1 Ω) of vector subtracting the impedance G from the impedance M. Consequently overall resistance is not zero, and any fluctuation of the current flowing in inductive wires 19 (output current I) due to load resistance is suppressed.

Since the capacitive impedance in the capacitor 23 is inversely proportional to capacitance C, the capacitive impedance decreases as capacitance C of the capacitor 23 is increases. Hence capacitance C is easily adjustable. Moreover, adjusting capacitance C provides a more cost effective solution than increasing inductance L of the variable inductor 22. Therefore it is desirable to have a capacitive impedance for the overall inductive circuit, through the deployment of larger capacitive impedance from the capacitor 23 and smaller inductive impedance from the variable inductor 22 and inductive wires 19.

A power receiving unit 31 is connected to the signal pickup coil 20A of the signal pickup unit 20 in the transport cart 3, and the power receiving unit 31 is then linked to the transport motor 15.

The power receiving unit 31 connected in series to the signal pickup coil 20A comprises a resonating capacitor 33, providing a resonant circuit that resonates at the operating frequency of the signal pickup coil 20A and the inductive wires 19. The resonating capacitor 33 in the resonant circuit is connected in parallel to the input of saturation inductor 34. The split output of saturation inductor 34 is connected to a rectifier 35, which in turns has its output connected in parallel to a equalizing capacitor 36. The equalizing capacitor 36 is then connected to a current converter 32. The saturation voltage at the saturation inductor 34 is derived from the current in the current converter 32 and the step size of the transport motor 15. The saturation voltage and the step voltage of the power receiving unit 31 (equivalent to the output voltage at saturation inductor 34) determine the input and output winding ratio of the saturation inductor 34.

The power supply 21 includes an AC power supply corresponding to AC200 V3 phase, a current converter 42, a current alternator 43, an limiting transistor 44 and a diode 45. The current converter 42 is implemented through a full wave rectifier 46, a filter coil 47, a capacitor 48, a resistor 49, and a transistor 50 shorted across the resistor 49. The current alternator 43 comprisescomprises a current limiting coil 51 and a full bridge rectifier. The full bridge rectifier is made up of 4 transistors 52 and is driven by square wave signals.

Power supply device 21 incorporates a controller 61 for the transistors 52 in the current alternator 43.

The controller 61 comprises a power detection circuit 62, a current detection circuit 63, and a controller circuit. The power detection circuit 62 monitors the output voltage and the output current of the current alternator 42, evaluates the output power flowing from the current converter 42 to the current alternator 43 by sensing output power of power supplying inductive wires 19. The current detection circuit 63 detects an output current from the current converter 42 to the power supplying inductive wires 19. The controller circuit constitutes a duty computing circuit 64 and a pulse generating circuit 65. The duty computing circuit 64 employs the output current of the current detection circuit 63 as a reference, and evaluates the duty of the square wave driving the transistor 52 in the current alternator 43. The pulse generating circuit 65 incorporates a pulse width modulation (PWM) circuit using the duty from the duty computing circuit 64 and a gate driving circuit 65.

Figure 5:
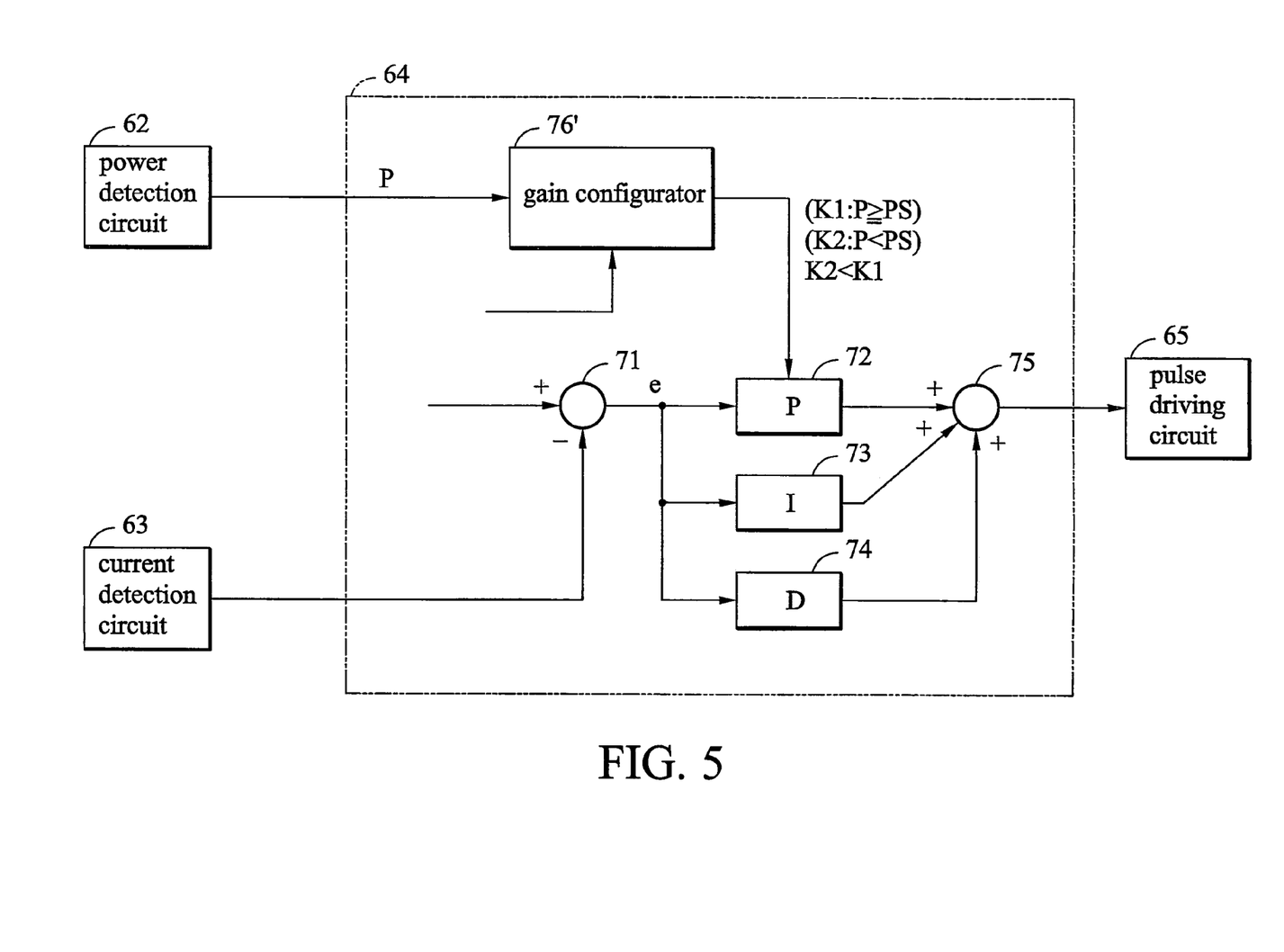
FIG. 5 is a block diagram of a duty computing circuit in a contactless power supply system for object transportationobject transportation.

The duty computing circuit 64 shown in FIG. 5, comprises a subtractor 71, a multiplier 72, an integrator 73, a differentiator 74, an adder 75, and a gain configurator 76. The subtractor 71 evaluates deviant current e by subtracting the value of output current of the current detection circuit 63 from a reference value. The multiplier 72 multiplies the deviant current e by a gain K, the integrator 73 integrates the deviant current e, and the differentiator 74 differentiates the deviant current e. The adder 75 adds outputs from the multiplier 72, the integrator 73, and the differentiator 74, then utilizes the resulting value for duty output to the pulse generating circuit 65. The gain configurator 76 initiates a value for the gain K at the multiplier 72, with the output power from the power detection circuit 62. The multiplier 72, the integrator 73, and the differentiator 74 make up a proportional integral derivative (PID) controller. The value of the duty is dominated by the output of the integrator 73, with the outputs of multiplier 72 and the integrator 73 tuning the final outcome of the duty.

The gain configurator 76 yields a gain K1 while the output power detected at the power detection circuit 62 exceeds a predetermined power value PS, providing another smaller gain K2 when less than the given PS.

The following details the circuit implementation of the power supply device 21, the inductive wires 19, and the transport cart 3.

First, alternating current source 41 introducing an alternating current with AC 200 V3 phase, is converted to direct current by the current converter 42. The direct current is then adapted to a high frequency alternating current, such as 10 KHz, via the current alternator 43. The high frequency alternating current is output to the inductive wires 19. The top and bottom inductive wires 19 generate a magnetic field, whereby the signal pickup coil 20A at the transport cart 3 at the transport rail 1 is induced a power. The resonating capacitor 33, constituting a resonant circuit with signal pickup coil 21A applies a resonant voltage to the saturation inductor 34. The saturation inductor 34 restrains increase in resonant voltage, and provides a current converter 32 with a substantially stable DC voltage by a rectifier 35.

For the controller 61, the power detection circuit detects the power consumed at the current alternator 43, equivalent to the power outputting to the subsequent inductive wires 19. The detected output power of the inductive wires 19 influences the choice of gain K for the multiplier 72 in the duty computing circuit 64. The current detection circuit 63 detects the current flowing out of the current converter 42, and thereby the current outputting to the subsequent inductive wires 19. The detected output current and a reference current in the duty computing circuit 64 are compared, with resultant current deviation e output to the pulse generating circuit 65. From the pulse generating circuit 65 onwards, a square wave signal is directed to the transistors 52 of the current alternator 43. The transistors 52 generate AC voltage (output voltage) with predetermined frequency f (e.g., 10 KHz), and AC current at a predetermined high frequency (e.g., 10 KHz) for the design load resistance, to the inductive wires 19. The result is an output voltage for load resistance R and an output current within the range of the reference current.

Since transport cart 3 is stopped, load resistance drops and the output current increases, hence the duty computing circuit 64 reduces duty to return voltage to a lower level. Because the reduction in the duty lowers the voltage level while gain K stays high, output current falls below the reference current, and the voltage is raised again until reaching divergence. To solve this problem, the output power is monitored from the controller 61, once the load resistance R decreases and output power falls below a predetermined value PS, and gain K is reduced from a higher gain K1 to a lower gain K2, so that the variation in duty is suppressed, as is fluctuation of the output current.

Once the transport cart 3 starts to move, load resistance increases and output power raises above the predetermined power value PS. Thereby, the output gain K at pulse generating circuit 65 switches from gain K2 to K1 (increased gain). The variation in duty increases again, so that the fluctuation of the output current follows the load resistance difference closely.

In the embodiment of the present invention, the capacitive impedance of the capacitor 23 is set to exceed the vector sum of the inductive circuit 19 at the predetermined (resonant frequency) f. Therefore, the current fluctuation in the inductive wires 19 is suppressed and the contactless power supply system becomes manageable.

In the present embodiment, the output power p is a predetermined value PS, a control constant K at duty generating circuit (the control circuit) 64 is chosen with respect to the value PS, i.e., the output gain K is switched to a lower value when the output power p is less than PS, hence the variation in square wave signal is suppressed. In doing so the output current fluctuation from variation of load resistance R is minimized, and the current through the inductive wires 19 is stabilized.

In the present embodiment, the output gain K functions as a control constant, controlling the output of the multiplier 72 in the control circuit. Alternatively, it is possible to adjust, with respect to output power p, each integral timing step $T_I$ at the integrator 73 and each differential timing step $T_D$ at the differentiator 74 in the PID controller. The gain configurator 76 is modified to generate a larger integral timing step $T_I1$ and a larger differential timing step $T_D1$ when output power p is detected by the power detection circuit 62 to exceed the predetermined value PS, and a smaller integral timing step $T_I 2$ ($T_I 2 > T_I 1$) and a smaller differential timing step $T_D 2$ ($T_D 2 > T_D 1$) in the case of the output power p falls below the predetermined value PS. Each of gain K, integral timing step $T_I$, and differential timing step $T_D$ can be utilized separately or in any combination with respect to the output power p. Moreover, a plurality of PID controllers, each acknowledges a different output power p engaged to produce the duty.

Figure 6A:
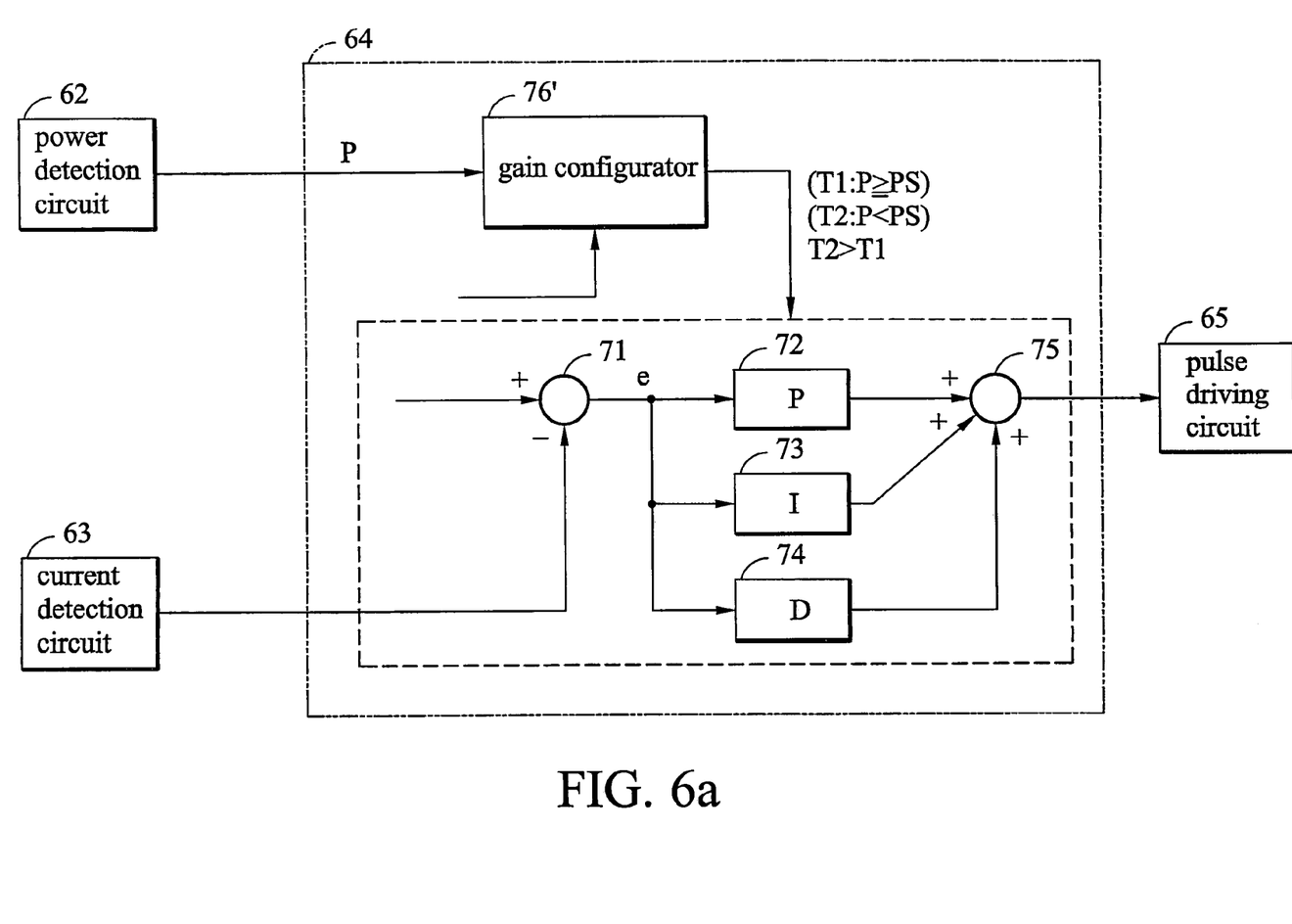
FIG. 6 ia block diagrams of other duty computing circuits in the contactless power supply system for object transportationobject transportation of the present invention.

In the present embodiment, the output power p is compared with a predefined power value PS, and an output gain K is selected through the duty computing circuit (control circuit) 64. Nevertheless, it is sometimes desirable to replace gain K, as demonstrated in FIG. 6(*a*). In this case, it could make use of the refresh time, i.e. the computing duration for the new duty, of a duty computing part (i.e., the subtractor 71, the multiplier 72, the integrator 73, the differentiator 74, and the adder 75) of the duty computing circuit (control circuit) 64. The configurator 76 and the duty computing part have different refresh times (the refresh time of the configurator 76 is shorter than the refresh time of the duty computing part). The configurator 76 selects a refresh time T1 when the output power p exceeds a predetermined value PS, and switches to a longer refresh time T2 (T2>T1) when output power p is less than the predetermined value PS.

As a consequence, it takes longer (refresh time) to compute the duty when the output power p is less than the predetermined value PS, hence the variation of the square wave is retarded, and output current I fluctuation from variation in load resistance is avoided.

Figure 6B:
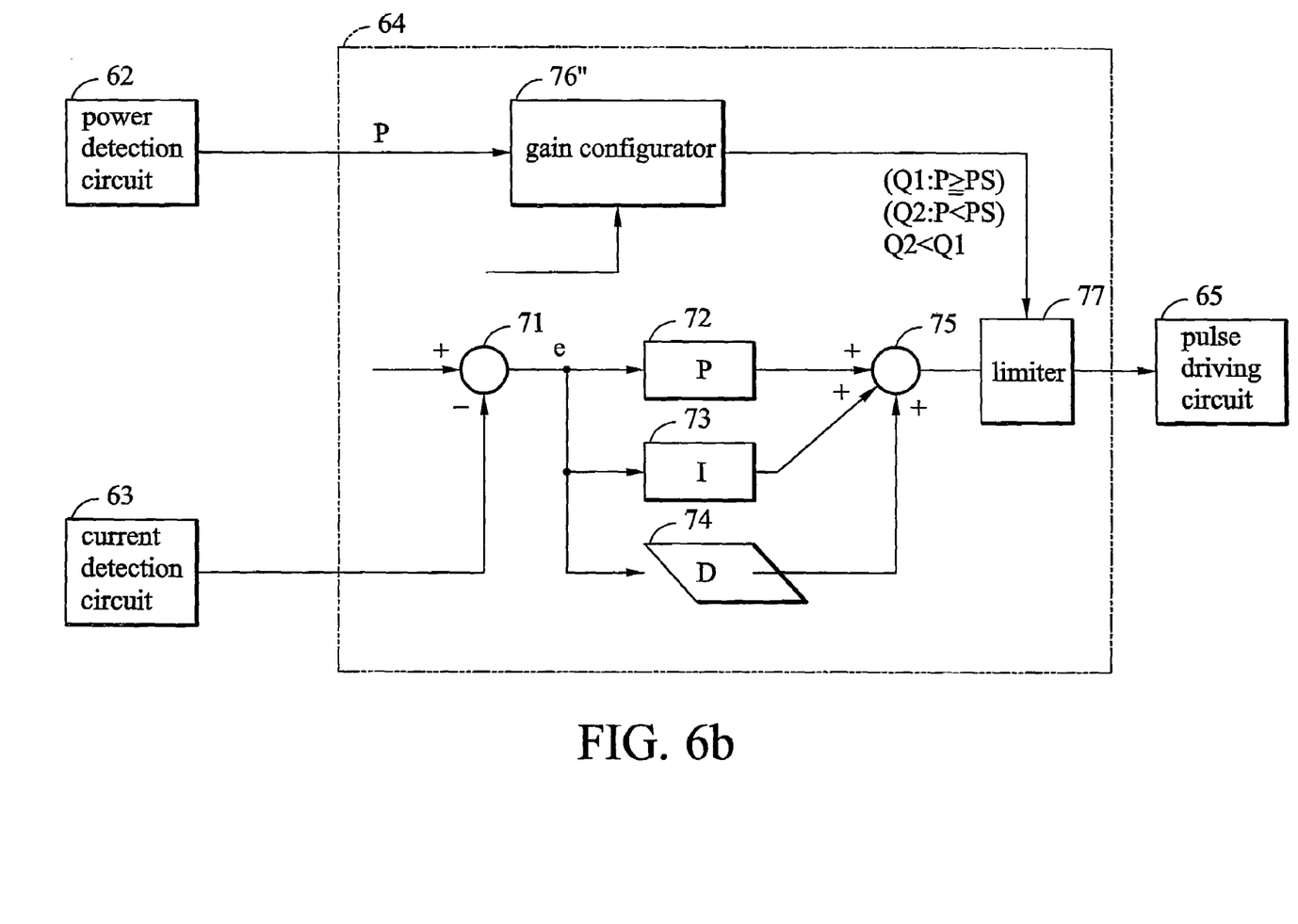

In the present embodiment, the output power p is compared with a predefined power value PS, and an output gain K is selected by the duty computing circuit (control circuit) 64. It is sometimes desirable to replace gain K, as demonstrated in FIG. 6(*b*). It is possible to insert a limiter 77 to limit the output duty (place a limitation on the adjustable range). The output power p switches to an adjustable range (the upper limit). The configurator 76 selects an adjustable range Q1 when the output power p exceed a predetermined value PS, and switches to a smaller adjustable range Q2 (Q2<Q1) when output power p is less than the predetermined value PS.

As a result, the adjustable range is less when the output power p is less than the predetermined value PS, hence the variation range of the square wave is restricted, and output current I fluctuation from variation in load resistance is avoided.

In the present embodiment, the output power p is divided into two, and only one predetermined power value PS is set. Nonetheless, multiple interval ranges for output power p can be applied, thus multiple PS, and the corresponding gain K, integral timing step $T_I$, and differential timing step $T_D$, or adjustable range Q.

In the present embodiment, the predetermined power value is fixed. However, the predetermined power value is subject to change to fulfill the power needs for various transporting route and number of the transport cart 3.

In the present embodiment, transistors are employed as the switching components in the power supply device. It should be clear that the switching component is not restricted to transistors, in some examples thyristors semiconductor can be used instead.

In the present embodiment, the moving part refers to the transport carts 3 moving along rail 1. It should be clear that any object can move along the predetermined path.

The foregoing description of several embodiments have been presented for the purpose of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A contactless power supply system, comprising:
   a power supply device, comprising:
   inductive wires for an alternating current power supply at a predetermined frequency along a traveling path; and
   a plurality of switching devices driven by square waves respectively converting direct current to alternating current with the predetermined frequency to supply the inductive wires,
   a moving object on the traveling path, comprising:
   a power inducing coil that induces power through the inductive wires and supplies power to the moving object load; and
   wherein the inductive wires are connected in series to a capacitor, and a variable inductor as a predetermined length of the inductive wires is not reached; and
   wherein the inductive wires, connected in series to the capacitor and the variable inductor under the predetermined frequency result in a capacitive impedance.

2. The contactless power supply system of claim 1, further comprising:
   a current detection circuit, detecting an output current supplying to the inductive wire;
   a power detection circuit, detecting an output power supplying to the inductive wire; and
   a control circuit, controlling duty of the square waves that drives the switching devices, in response to an output current detected at the current detection circuit;
   wherein the control circuit switches to a control constant, based on output power detected at the power detection circuit.

3. The contactless power supply system of claim 1, further comprising:
   a current detection circuit, detecting an output current supplying to the inductive wire;
   a power detection circuit, detecting an output power supplying to the inductive wire; and
   a control circuit, controlling duty of the square waves that drives the switching devices, in response to an output current detected at the current detection circuit;
   wherein the control circuit selects a duration for evaluation of the duty, based on the output power detected at the power detection circuit.

4. The contactless power supply system of claim 1, further comprising:
   a current detection circuit for detecting an output current supplying to the inductive wire;
   a power detection circuit, detecting an output power supplying to the inductive wire; and
   a control circuit, controlling a duty of the square waves that drives the switching devices, in response to an output current detected at the current detection circuit;
   wherein the control circuit, selects an adjustable range of the duty, based on the output power detected at the power detection circuit.

* * * * *